United States Patent
Noble et al.

(10) Patent No.: US 8,297,027 B2
(45) Date of Patent: Oct. 30, 2012

(54) ENGINEERED MOLDED FIBERBOARD PANELS AND METHODS OF MAKING AND USING THE SAME

(75) Inventors: Robert Noble, Encinitas, CA (US); Hongmei Gu, Madison, CA (US); Timothy L. Newburn, San Diego, CA (US); James F. Mahoney, Encinitas, CA (US); John F. Hunt, Mount Horeb, WI (US)

(73) Assignees: The United States of America as represented by the Secretary of Agriculture, Washington, DC (US); Noble Environmental Technologies Corp., La Jolla, CA (US)

( * ) Notice: Subject to any disclaimer, the term of this patent is extended or adjusted under 35 U.S.C. 154(b) by 340 days.

(21) Appl. No.: 12/412,554

(22) Filed: Mar. 27, 2009

(65) Prior Publication Data

US 2009/0255205 A1    Oct. 15, 2009

Related U.S. Application Data

(60) Provisional application No. 61/040,596, filed on Mar. 28, 2008.

(51) Int. Cl.
*E04C 2/32* (2006.01)
(52) U.S. Cl. ............... 52/783.11; 52/783.17; 52/783.19
(58) Field of Classification Search ............... 52/783.11, 52/783.17, 783.19, 793.1, 798.1, 86, 87
See application file for complete search history.

(56) References Cited

U.S. PATENT DOCUMENTS

| | | | |
|---|---|---|---|
| 1,189,518 A | | 7/1916 | Wood |
| 1,365,059 A | * | 1/1921 | Piccirilli .................... 52/783.11 |
| 1,461,337 A | | 7/1923 | Weiss |
| 1,488,504 A | | 4/1924 | Keyes |
| 1,794,435 A | | 3/1931 | Barth |

(Continued)

FOREIGN PATENT DOCUMENTS

AU       B-76372/91       5/1993

(Continued)

OTHER PUBLICATIONS

Teddi Baron, From cow chips to cow barns, Inside Iowa State, May 19, 2000, available at http://www.iastate.edu/Inside/2000/0519/cowchips.html.

(Continued)

*Primary Examiner* — Basil Katcheves
*Assistant Examiner* — Rodney Mintz
(74) *Attorney, Agent, or Firm* — Stephen C. Beuerle; Procopio Cory Hargreaves & Savitch LLP

(57) ABSTRACT

A fiberboard panel is formed from at least one corrugated sheet of molded cellulose fiber material having alternating ribs and grooves. Spaced slits are cut through the ribs on one face of the sheet and terminate short of the opposite face so as to form at least one slotted portion of more flexibility which may be bent to form a curve. The corrugated sheet is sandwiched between two flat sheets of the same material to form a composite panel. The corrugated sheet or panel is formed by a wet processing method including successive cold and hot press steps in which a wet mat is pressed between an opposing perforated platen and non-perforated, elastomeric material platen of cross-sectional shape substantially matching the desired panel shape and dimensions.

15 Claims, 14 Drawing Sheets

U.S. PATENT DOCUMENTS

| | | | |
|---|---|---|---|
| 2,058,334 A | 10/1936 | Mason | |
| 2,070,401 A | 2/1937 | Greider et al. | |
| 2,200,107 A | 5/1940 | Weitz | |
| 2,202,772 A | 5/1940 | Durdin, Jr. | |
| 2,313,434 A | 3/1943 | Grether | |
| 2,481,049 A | 9/1949 | Stamm et al. | |
| 2,640,517 A | 6/1953 | de Mello | |
| 2,722,311 A | 11/1955 | Morrison | |
| 2,764,193 A | 9/1956 | Knowles | |
| 2,766,787 A | 10/1956 | Knowles | |
| 2,785,717 A | 3/1957 | Knowles | |
| 3,083,128 A | 3/1963 | Herrington | |
| 3,102,364 A | 9/1963 | Pullen | |
| 3,120,466 A | 2/1964 | Bojanowski | |
| 3,354,248 A | 11/1967 | Haas | |
| 3,372,018 A | 3/1968 | Stocker et al. | |
| 3,449,482 A | 6/1969 | Mitchell | |
| 3,575,768 A | 4/1971 | Hannum | |
| 3,720,176 A | 3/1973 | Munroe | |
| 3,823,108 A | 7/1974 | Posch et al. | |
| 3,830,684 A * | 8/1974 | Hamon | 261/112.2 |
| 3,861,326 A | 1/1975 | Brown | |
| 3,884,749 A | 5/1975 | Pankoke | |
| 4,061,813 A | 12/1977 | Geimer et al. | |
| 4,221,751 A | 9/1980 | Haataja et al. | |
| 4,267,137 A | 5/1981 | Smith | |
| 4,358,916 A * | 11/1982 | Lacasse | 52/630 |
| 4,409,274 A | 10/1983 | Chaplin et al. | |
| 4,544,344 A | 10/1985 | Munk | |
| 4,616,991 A | 10/1986 | Bach et al. | |
| 4,629,594 A | 12/1986 | Munk | |
| 4,675,138 A | 6/1987 | Bach et al. | |
| 4,695,033 A * | 9/1987 | Imaeda et al. | 249/189 |
| 4,702,870 A | 10/1987 | Setterholm et al. | |
| 4,753,713 A | 6/1988 | Gunderson | |
| 4,904,517 A | 2/1990 | Lau et al. | |
| 5,000,673 A | 3/1991 | Bach et al. | |
| 5,198,236 A | 3/1993 | Gunderson et al. | |
| 5,277,854 A | 1/1994 | Hunt | |
| 5,290,621 A | 3/1994 | Bach et al. | |
| 5,314,654 A | 5/1994 | Gunderson et al. | |
| 5,443,891 A | 8/1995 | Bach | |
| 5,457,921 A * | 10/1995 | Kostrzecha | 52/202 |
| 5,543,234 A | 8/1996 | Lynch et al. | |
| 5,630,299 A * | 5/1997 | Jackman et al. | 52/169.5 |
| 5,738,924 A | 4/1998 | Sing | |
| 5,766,774 A | 6/1998 | Lynch et al. | |
| 5,794,388 A * | 8/1998 | Jackman | 52/169.5 |
| 5,830,548 A | 11/1998 | Andersen et al. | |
| 5,833,805 A | 11/1998 | Emery | |
| 5,876,835 A | 3/1999 | Noble et al. | |
| 5,900,304 A | 5/1999 | Owens | |
| 6,003,283 A * | 12/1999 | Hull | 52/783.18 |
| 6,112,482 A * | 9/2000 | Wright et al. | 52/220.4 |
| 6,122,892 A * | 9/2000 | Gonidec et al. | 52/793.1 |
| 6,176,065 B1 * | 1/2001 | Honda | 52/783.18 |
| 6,190,151 B1 | 2/2001 | Hunt | |
| 6,306,997 B1 | 10/2001 | Kuo et al. | |
| 6,364,982 B1 | 4/2002 | Lynch et al. | |
| 6,385,942 B1 * | 5/2002 | Grossman et al. | 52/798.1 |
| 6,451,235 B1 | 9/2002 | Owens | |
| 6,511,567 B1 | 1/2003 | Ruggie et al. | |
| 6,518,387 B2 | 2/2003 | Kuo et al. | |
| 6,541,097 B2 | 4/2003 | Lynch et al. | |
| 6,557,308 B1 * | 5/2003 | Snel | 52/79.4 |
| 6,579,483 B1 | 6/2003 | Vaders | |
| 6,676,785 B2 | 1/2004 | Johnson et al. | |
| 6,773,791 B1 | 8/2004 | Ruggie et al. | |
| 6,974,622 B2 * | 12/2005 | Wade | 428/182 |
| 6,990,775 B2 * | 1/2006 | Koester | 52/302.1 |
| 7,074,302 B2 | 7/2006 | Renck et al. | |
| 7,077,988 B2 | 7/2006 | Gosselin | |
| 7,487,624 B2 * | 2/2009 | Baba | 52/783.19 |
| 8,109,060 B1 * | 2/2012 | Motosko | 52/656.7 |
| 2003/0041547 A1 | 3/2003 | Gosselin | |
| 2005/0066619 A1 | 3/2005 | McDonald | |
| 2005/0074587 A1 * | 4/2005 | Snel | 428/182 |
| 2005/0138879 A1 | 6/2005 | Snel | |
| 2005/0274075 A1 | 12/2005 | Freund et al. | |
| 2006/0174550 A1 * | 8/2006 | Smerud et al. | 52/86 |
| 2009/0107312 A1 * | 4/2009 | Lewis et al. | 83/76.1 |
| 2009/0158686 A1 * | 6/2009 | Oki et al. | 52/643 |
| 2010/0078985 A1 * | 4/2010 | Mahoney et al. | 297/446.1 |
| 2011/0209437 A1 * | 9/2011 | Bertero | 52/783.11 |

FOREIGN PATENT DOCUMENTS

| | | |
|---|---|---|
| JP | 10-166481 | 6/1998 |
| JP | 13059310 | 3/2001 |
| JP | 15103666 | 4/2003 |
| WO | WO 9849403 A2 * | 11/1998 |
| WO | 2004054793 | 7/2004 |
| WO | WO 2007139143 A1 * | 12/2007 |

OTHER PUBLICATIONS

Tom L. Richard, Thinking outside the box: building materials and other products from animal processed fiber, Feb. 21, 2003, http://ageconsearch.umn.edu/bitstream/33179/1/fo03ri01.pdf.

Vivian Tracy, Ecowpots inventor makes haste with bovine waste, Sep. 2008, http://steve-lewis.blogspot.com/search?=bovine.

J. Winandy and Z. Cai, Potential of using anaerobically digested bovine biofiber as a fiber source for wood composites, BioResources (Peer-review completed: Sep. 22, 2008; Revised version received and accepted: Oct. 8, 2008; Published: Oct. 10, 2008, available at http://www.ncsu.edu/bioresources/BioRes_03/BioRes_03_4_1244_WinandyCai_Using_Anaerob_Dig_Bovine_Fiber_Compos_332.pdf.

H. Spelter, J. Winandy, and J. Zauche, Anaerobically digested bovine biofiber as a source of fiber for particleboard manufacturing: An economic analysis, BioResources (Article submitted: Jul. 3, 2008; Peer review completed: Aug. 6, 2008; Revised version received and accepted: Sep. 22, 2008; Publication: Oct. 10, 2008), available at http://www.bioresourcesjournal.com/index.php/bioRes/article/viewFile/BioRes_03_4_1256_Spelter_WZ_ABDF_Particleboard/278.

L Matuana and M. Gould, Promoting the use of digestate from anaerobic digesters in composite materials, Oct. 24, 2006, available at https://www.msu.edu/~matuana/images/CompositesProjectfinalReport2.pdf.

Bench using bovine fiber built by John Hunt of Forest Products Laboratory, shown at World DairyExpo, Madison, WI, Oct. 2007 at the GHD Inc. booth, 1 page.

Picture of Performance Designed Composites Research label, Forest Products Laboratory, Madison, Wisconsin, date unknown, 1 page.

John F. Hunt and Jerrold E. Winandy, 3D Engineered Fiberboard: A New Structural Building Product, Performance Engineered Composites, RWU4706, USDA Forest Service, Forest Products Laboratory, date unknown, 1 page.

David N, Goodman, Manure: you may be walking on it soon, Associated Press, Feb. 9, 2007, 3 pages.

International Search Report and Written Opinion for PCT/US2009/38660 dated Dec. 19, 2009.

International Search Report and Written Opinion from related PCT/US09/038650 dated Oct. 8, 2009.

* cited by examiner

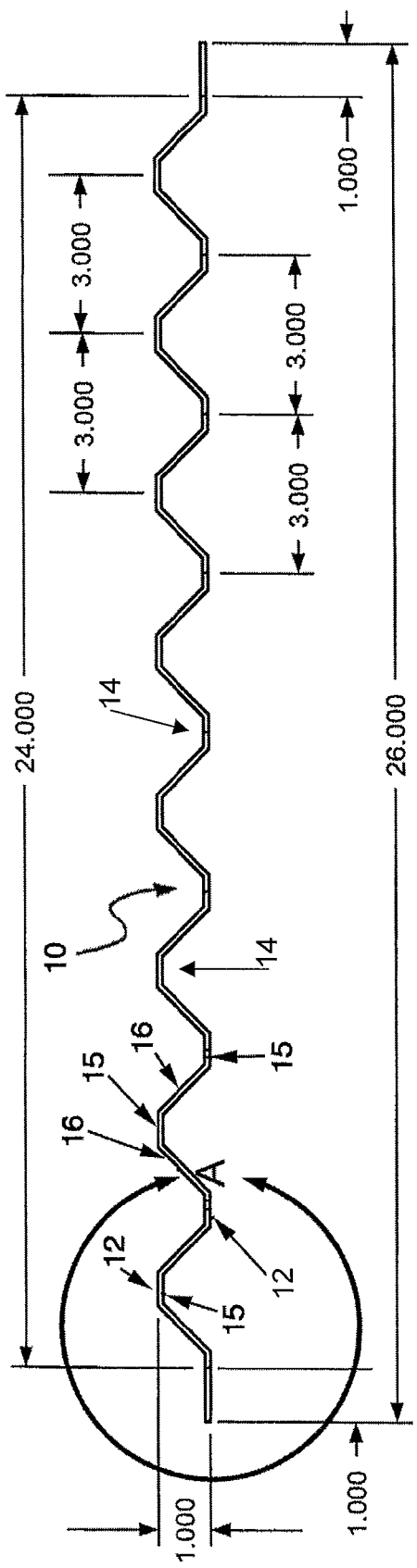
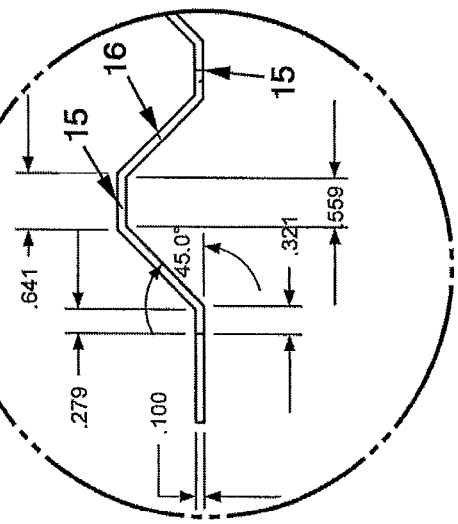
FIG. 2A
FIG. 2B

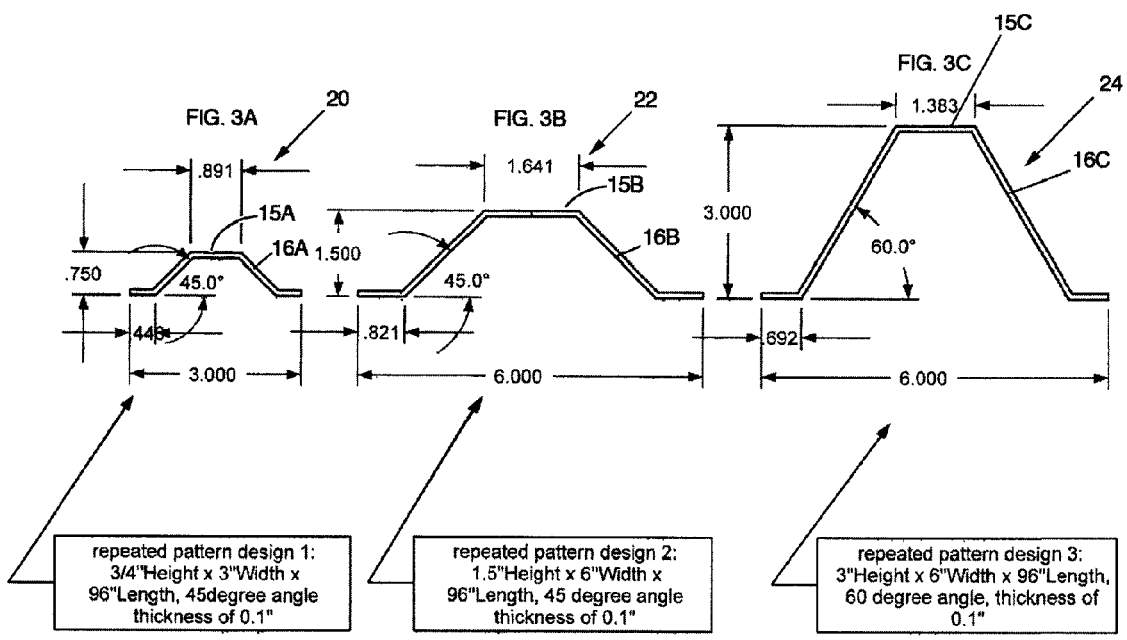

ENGINEERED MOLDED FIBERBOARD PANELS AND METHODS OF MAKING AND USING THE SAME

RELATED APPLICATION

The present application claims the benefit of co-pending U.S. provisional patent application No. 61/040,596 filed Mar. 28, 2008, which is incorporated herein by reference in its entirety.

GOVERNMENT LICENSE RIGHTS

The U.S. Government has a paid-up, royalty-free, nonexclusive, nontransferable, irrevocable license in this invention and the right in limited circumstances to require the patent owner to license others on reasonable terms due to joint ownership of the invention and as provided for by the terms of CRADA (Cooperative Research and Development Agreement) No. 07-RD-11111124-027 awarded by the USDA, Forest Service.

BACKGROUND

1. Field of the Invention

This invention relates generally to engineered, pressure-molded fiberboard panel with applications in manufacturing, building construction, packaging, and other fields, and is particularly concerned with methods and apparatus for making such panels, panel core layers, multi-layer panels, and products made using such panels.

2. Related Art

"Dry-process" wood-product panels such as medium density fiberboard (MDF), particleboard (PB), and oriented strandboard (OSB) are known in the construction field. These products are largely manufactured by combining wood cellulose with formaldehyde-based resins and other bonding materials to form rigid panels. These panels are generally relatively heavy and not particularly flexible, and they are prone to toxic off-gassing caused by the resins used in manufacturing.

"Wet-process" panels are also known in the field. A "wet-process" panel is made by wet forming, i.e., panel materials and water are processed to form a slurry which is then poured over a form, and water is then removed by vacuum or the like. Known "wet-process" panels include mostly low-density cardboards, composite panel products, and agricultural fiberboards.

SUMMARY

In one embodiment, a method of making a fiberboard panel comprises hydro pulping a fiber material to form a pulp which is then placed onto a perforated mold screen having a cross section substantially identical to the desired panel cross section. Water is then removed from the panel through the openings in the screen, for example by applying a vacuum to the pulp, forming a fiber mat. The mold screen with the wet fiber mat is then transferred into a cold press between top and bottom platens, the bottom platen including a perforated screen while the top platen is elastomeric so as to apply higher compression as the two platens are pressed together to squeeze water out of the mat. The mold screen and mat are then transferred into a hot press between two platens, the lower platen again having a perforated screen and the top platen again being of elastomeric material. The platens are then closed over the cold-pressed mat so that additional dewatering occurs through squeezing and by vaporization. Again, the elastic top platen produces higher compression and greater densification in the mat. The platens are then separated and the finished panel is transferred out of the press.

Through continuous hot-pressing of lignocellulosic fiber between mold elements, flat and three-dimensional panels can be molded into a specially engineered form. Continuous hot-pressing produces strong inter-fiber bonds, even using relatively low-quality fiber. Panels can be pressed flat, or a corrugated mold can be used to create longitudinal ridges. When a corrugated structural core is bonded to flat-panel exterior skins, a lightweight, three-dimensional stressed-skin panel is formed that exhibits a high level of strength and stiffness.

The fiberboard panel material may made from a wide range of cellulose fiber sources, including wood and plant fibers, agricultural biomass, and recycled fiber. In one embodiment, bovine processed fiber (BPF) is used for the panel material. BPF is bovine waste (i.e., agricultural fiber that has been consumed and digested by cows) that has been further processed using simple anaerobic digester technology commonly found at many cattle and dairy farms. In one embodiment, BPF is used by itself to make the panel, while in others it is used in combination with other fiber sources such as old corrugated cardboard (OCC) or old newspaper (ONP).

Fiberboard panels made using the above method have generally higher density, favorable strength-to-weight and strength-to-flexibility ratios, and overall eco-friendliness. In some embodiments, panels are designed to accept and hold curves in post-production.

According to another aspect, a fiberboard panel for use in construction is provided which is corrugated to form a plurality of parallel ribs running along the length of the panel. The corrugated panel may be made by the above method from the material described above, and may be used as a structural panel on its own, or may be laminated as a core between two fiberboard flat panels to produce a higher strength, multi-layer panel. In one embodiment, the panel has alternating oppositely directed ribs extending across the width of the panel, each rib having an outer flat peak or flange and a pair of angled webs extending from the flange and terminating at the respective flanges of the adjacent, oppositely directed webs. The oppositely directed peaks form opposite outer faces of the corrugated panel and are substantially flat for ease in bonding to opposite surfaces. The angled webs may be at an angle in the range of 45 to 60 degrees to the flange or peak of each rib, with the angle being greater for taller ribs. The cross sectional dimensions, flange dimensions, and web dimensions are calibrated for compatibility with building industry standards, so as to make measuring and locating of internal flanges, for example inside walls, easier and faster for fastening purposes. In one embodiment, the center to center spacing between adjacent flanges on each side of the panel is four inches, which further facilitates compatibility with building industry standards.

In another embodiment, a fiberboard panel with ribs is cut periodically with groups of multiple parallel slits extending through the peak and flanges from one face of the panel, but terminating short of the opposite panel face. This allows a curved shape to be formed by bending the panel at the slit location or locations. In one embodiment, the slits are positioned on the inside of the desired curve so that they tend to close on curving. The slits may be made perpendicular to the ribs, or may be cut in other directions such as diagonal, radial, or the like. The slits may be of uniform or variable spacing. In one embodiment, the groups of slits are all made on one face of the panel, while in other embodiments slits may be formed alternately on opposite faces of the panel. This allows panels to be formed into a variety of different curved shapes and used for manufacture of various different products.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2A is a cross sectional view of the panel of FIG. 1;

FIG. 2B is an enlarged view of the circled area of the panel of FIG. 2A;

FIGS. 3A, 3B and 3C are views similar to FIG. 2A of a set of corrugated panels having dimensions which increase incrementally from one panel to the next;

DETAILED DESCRIPTION

Certain embodiments as disclosed herein provide for engineered molded fiberboard panels of various shapes and configurations, as well as methods and apparatus for making such panels.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 1:
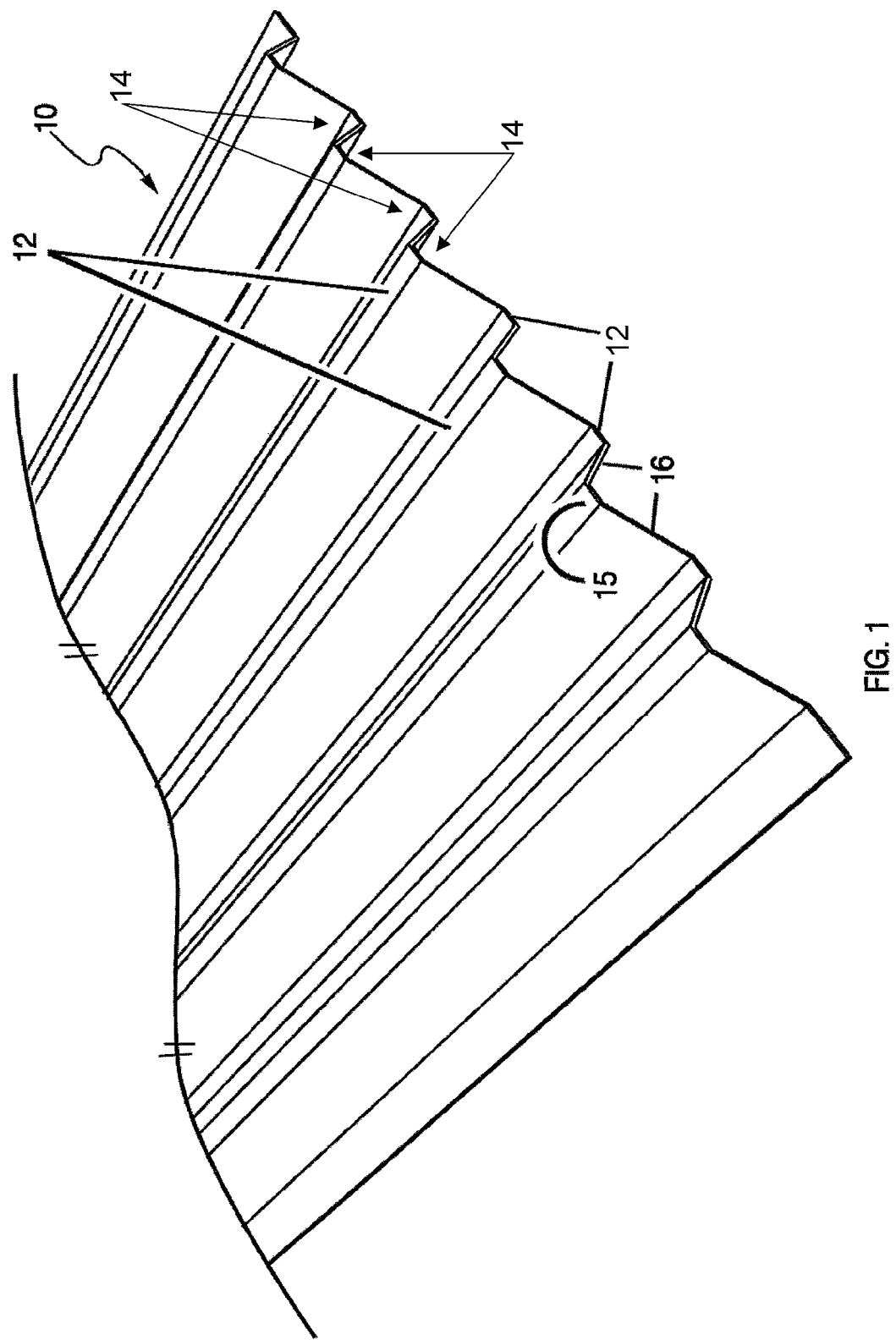
FIG. 1 is a perspective view of a corrugated fiberboard panel according to a first embodiment.

FIGS. 1 and 2 illustrate one embodiment of a corrugated panel 10. Each face of panel 10 has a plurality of alternating, longitudinally extending ribs 12 and grooves 14 extending along the length of the sheet, the ribs on the first face facing in the opposite direction to the ribs on the opposite face. In one embodiment, the panel is of molded fiber material and may be produced from a variety of materials and raw material mixes (matrices) including wood fiber, agro-fiber, including plant fibers and bovine processed fiber (BPF), and post-consumer waste such as old corrugated cardboard (OCC) and old newsprint (ONP). The panel may be manufactured using a modified "wet-process", as described in more detail below in connection with FIGS. 6 and 7. This process is similar to the process used for making paper and traditional fiberboard products, but without the addition of toxic resins or binders commonly found in many competitive panel products, especially those manufactured with older "dry-process" methods. This is possible because, with carefully controlled heat and pressure, the cellulose contained in a matrix of refined fibers (e.g., 50% OCC & 50% BPF) will react to form a natural thermosetting adhesive that gives strength and integrity to the finished fiber panel. In one embodiment, the panel was made from around 50% BPF and 50% ONP. These materials are inexpensive but were found to combine in forming a relatively high strength, flexible panel or sheet. In some cases, depending on the application, the panel may be treated with fire retardant or other additives.

Figure 4:
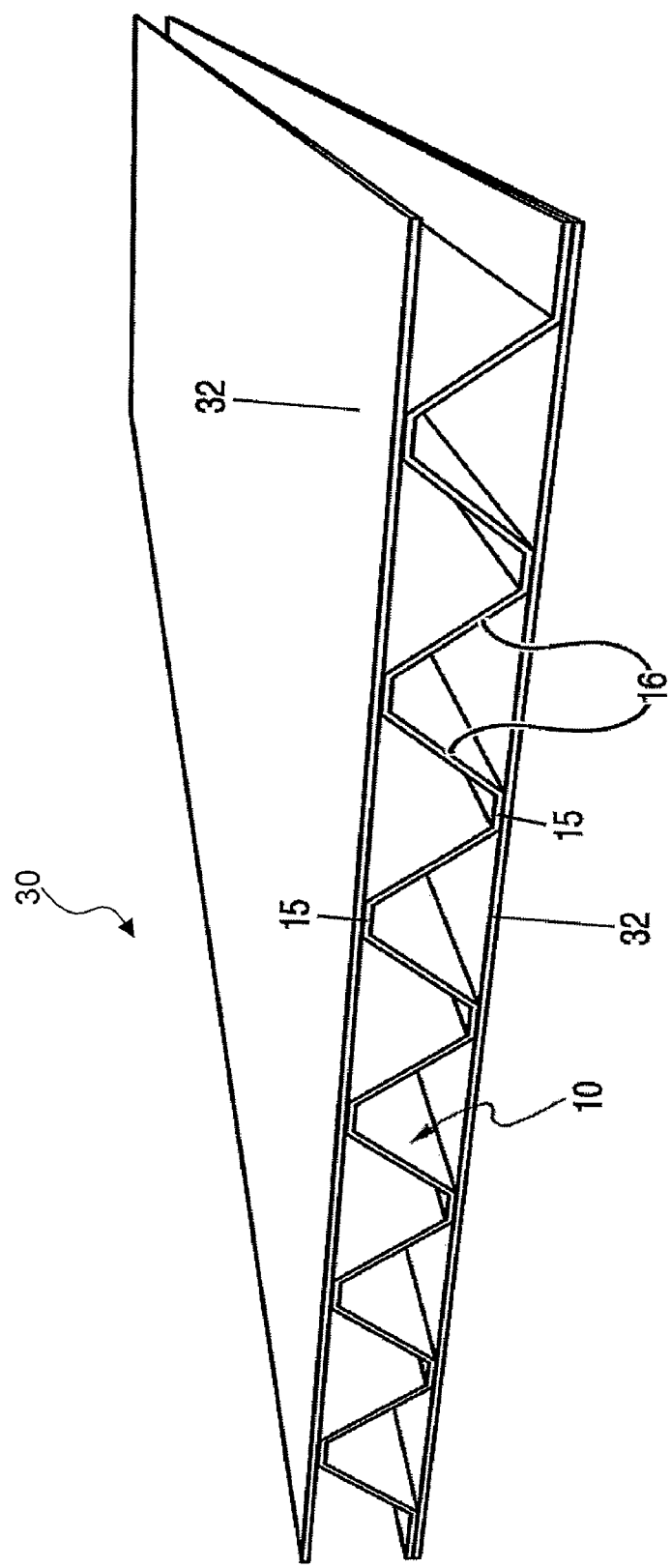
FIG. 4 is a perspective view of a laminated, stressed skin panel in which the corrugated panel of FIG. 1 is laminated between two flat fiberboard panels.

As illustrated in FIGS. 2A and 2B, each rib 12 has a flat outer flange or peak 15, and adjacent, oppositely directed peaks are connected by inclined webs 16. It has been found that an angle of around 45 degrees for the webs 16 makes it easier to standardize different panel dimensions for combinations of panels with each other and with other building materials, although other angles may be used in alternative embodiments. Additionally, a constant rib-to-rib center spacing for different dimension panels makes it easier to laminate or combine different panels to produce different three dimensional panel arrangements and to make the panels compatible with other standard construction material dimensions. In one embodiment, a four inch center to center spacing between adjacent peaks or flanges 15 is provided. If such a panel is arranged vertically in a wall behind a wall board or the like, the outermost rib flanges are at a four-inch spacing and can be easily located for attachment of fasteners or the like. The flanges 15 are positioned at the opposing, outer faces of the panel 10 and provide a planar area to adhere or fasten to facing material, such as the skin of a stressed skin panel 20 as illustrated in FIG. 4. The flanges perform a similar function to the flange of a wide flange "I" cross section structural member. The 45 degree angle of the webs 16 allows for consistency in joining two such panels together as a "mitre" to accomplish a ninety degree change in direction, for example as illustrated in the panel described below in connection with FIG. 5.

The panel 10 may be made in a variety of different cross-sectional dimensions, panel thicknesses, flange dimensions, web dimensions, and rib cross section shapes. In one embodiment, the different panels are all calibrated to increments of ¼ inch, ½ inch, ¾ inch, 1 inch, or the like. This facilitates compatibility with building industry standards and makes measuring and locating internal flanges easier and faster for fastening. Also, for a basic 1.5" high panel, with ½" flanges, the flanges are exactly 4" on center (oc) which facilitates compatibility as above. FIGS. 2A and 2B illustrate a corrugated or ribbed cross section panel 10 which has a height of about one inch, a peak width of around 0.5 to 0.6 inches, a web angle of 45 degrees, and a panel thickness of around 0.1 inches. The peak center to center spacing may be in the range from 3 inches to 6 inches. This spacing may be made constant for at least some different panel dimensions and rib cross sections, to facilitate combinations of different dimension panels.

FIGS. 3A, 3B and 3C illustrate a set of three panels 20, 22, and 24 of incrementally increasing height (0.75 inches, 1.5 inches, 3 inches). The web angles of panels 20 and 22 are both 45 degrees, like panel 10 of FIGS. 1 and 2. In one embodiment, panel 20 has a repeated pattern design of ¾ inch height, 3 inch center to center width, 96 inch length and 45 degree angle, with a thickness of 0.1 inch. Panel 22 has a repeated pattern design of 1.5 inch height, 6 inch center to center width, 45 degree angle of webs, thickness of 0.1 inch, and 96 inch length. Panel 24 has a repeated pattern design of 3 inch height, 6 inch center to center width, a 60 degree web angle, 0.1 inch thickness, and 96 inch length. The panels have peaks 15A, 15B and 15C, respectively, and angled flanges 16A, 16B, and 16C, respectively, extending between each pair of oppositely directed peaks. Dimensions and angles may be determined for product performance when used in furniture, construction and other applications.

FIG. 4 illustrates one embodiment of a composite, stressed-skin panel 30 which is made by sandwiching a corrugated, ribbed panel such as panel 10 between two flat panels or skins 32 which are made from the same fiber material as panel 10 using the same manufacturing process. This creates a stressed-skin panel with a very high strength to weight ratio. The corrugated and flat panels 10, 32 are flexible prior to being adhered together, but once laminated they form lightweight stressed-skin panels or structural panels with high strength, while still exhibiting some flexibility.

Figure 5:
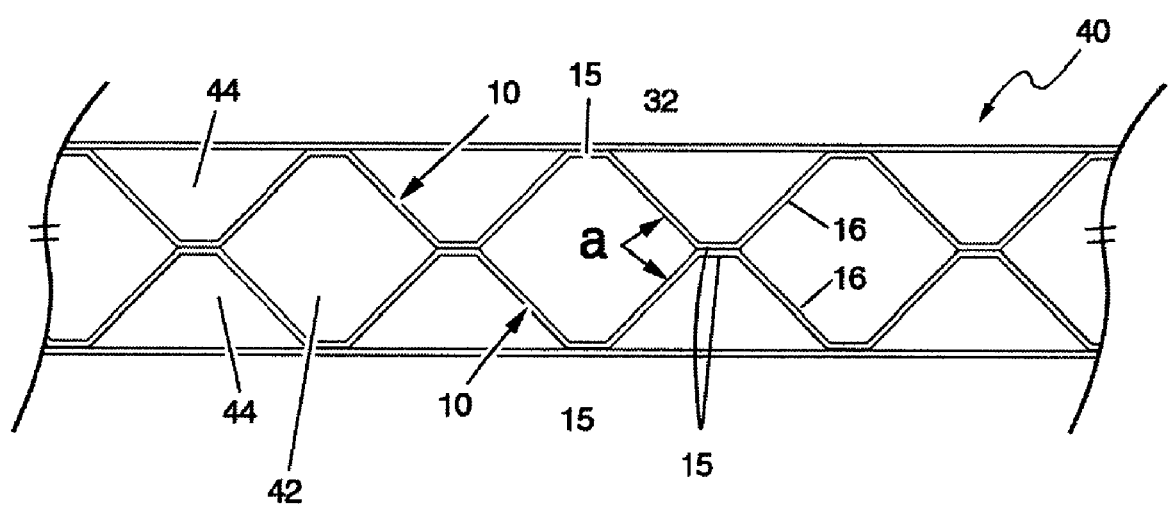
FIG. 5 is an end view of part of a modified laminated panel with two layers of corrugated panel as the core.

FIG. 5 illustrates a second embodiment of a composite stressed-skin panel 40. Panel 40 comprises a pair of corrugated panels 10 which are stacked one on top of the other with the inner rib peaks 15 aligned and adhered together, and which are then sandwiched between two flat panels or skins 32. The outer flat panels 32 are suitably adhered to the outermost flat peaks 15 of the respective panels 10. This creates a very strong and rigid panel. Since the angled webs 16 of the two corrugated panels 10 are each at 45 degrees, this creates a 90 degree change in direction (see Angle "a" in FIG. 5, for example). It also creates channels 42, 44 of different sizes which can be used for air distribution and as a pathway for conduit, pipes, building wiring, or the like through the panel.

The fiberboard panels and composite panels of FIGS. 1 to 5 have improved structural integrity and may be up to 4 times stronger than other panels of similar weight such as foam boards or paper honeycomb products. At the same time, the panels are lightweight, and may be as little as 25% of the weight of conventional panels engineered to the same bending strength, such as particleboard, plywood, medium density fiberboard (MDF) or oriented strand board (OSB). The panels are all light and durable panels, and are therefore easy to lift and transport. The light weight of the panels also results in reduced shipping and installation costs, and reduced injury and liability exposure in factory locations and on construction sites. The absence of chemicals and toxins in production process also makes the panels safer and gives rise to fewer regulatory issues due to non-toxic production process. The panels can be self supporting soffets and valances without the need for an elaborate secondary structural frame In one embodiment, the ribbed panels and flat panels described above are made by a process which involves:

1. Mechanical, chemical or other digestion of selected fiber or fibers into a "furnish."
2. Hydro pulping of the digested furnish (introducing into a water solution and mixing to separate all fibers into a "pulp").
3. Introduction of the pulp into the former (or deckle) box which has the perforated "mold screen" at its bottom. The mold screen has a cross section almost identical with the desired cross section of the finished panel, i.e., a ribbed or corrugated section when making the panels of FIGS. 1 to 3, or a flat section when making flat panels or skins 32.
4. Most of the water is removed through the perforated mold screen by a vacuum pulled from below. The remaining fiber mat has significantly even distribution of fibers with respect to thickness and fiber direction.
5. The walls of the former box are lifted, like a sleeve, up from the perimeter edge of the mold screen, which is sitting on the bottom structure of the former box.
6. The mold screen with the wet fiber mat is then transferred longitudinally into a cold press between the press's top and bottom platens which have cross sections virtually identical to the mold screen.
7. The cold press opening is then closed and pressurized to squeeze the water out of the wet mat on the mold screen. This water removal assists in reducing the time and energy requirements in the next step of hot pressing.
8. After the platens are separated, the mold screen with wet mat is then transferred into a hot press with top and bottom platens similar in cross section to the cold press. The hot platens then close on the cold-pressed wet mat on the mold screen. Additional de-watering occurs by squeezing and by vaporization, along with cellulose bonding.
9. When the mat has been densified due to heat and pressure and is virtually moisture free, the platens are separated and the mold screen and finished panel is transferred out of the press.
10. The finished panel is then separated from the mold screen, and the mold screen is returned to the former box for the next cycle.
11. The finished panel may then be sent to post-production, for cutting, adhering, laminating, or the like.

Both cold and hot press design may include a top perforated screen attached to the top platen, or, a top screen may be placed on the wet mat prior to entry into the cold press. The top screen fixed to the upper platen of the cold press opening simplifies production. In addition, an elastic, non porous material may be used to increase dewatering and densification of the mat in the cold press and hot press.

In the case that the top screen is not fixed to the top platens, the top screen is transferred through both the cold and hot press and be removed after hot pressing to be returned to the former box exit transfer area to be placed on a wet mat on mold screen exiting the former box.

The first stage of panel manufacturing (steps 1 and 2 above) is a wet-forming process whereby cellulose fibers and water are hydropulped to form slurry that is then poured over a form (step 3). In step 4, vacuum suction is applied to the bottom of the mold, thus pulling the water through the mold, but leaving the fiber to form into a flat or three-dimensional mat. When all the "free" water is pulled through the mat, the residual moisture content is about 80%. Additional cold pressing in steps 6 and 7 removes more "free" water, leaving only a minimal amount of "free" water and the saturated fibers. The formed mats are then placed in a hot press until dry (step 8). In one embodiment, the hot press conditions were 370° F. with continuous 200 psi pressure. The pressure profile slowly increases from 0 psi until it reaches 200 psi. The final target panel thickness is nominally 0.1 inch with a specific gravity of 0.9 to 1.0.

Figure 6:
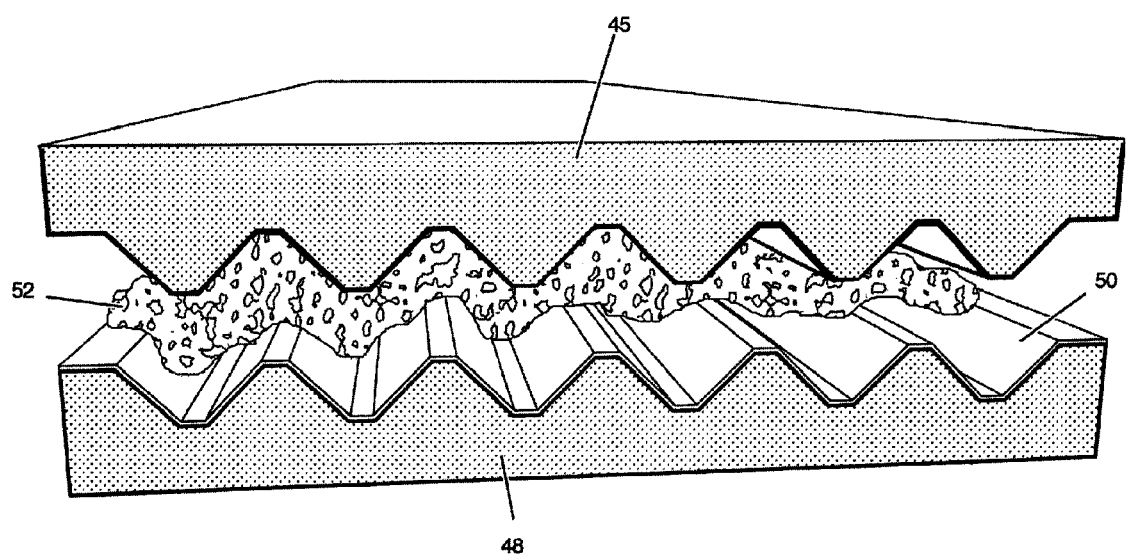
FIG. 6 is a cross-sectional view illustrating the opposing platens of one embodiment of a cold or hot press used in manufacturing the panel.

FIG. 6 illustrates one embodiment of the opposing upper and lower platens 45, 46 of the cold and hot presses used in the process described above to make a corrugated or ribbed panel. The lower platen 46 comprises a bottom, perforated plate or mold 48 of stainless steel or the like which has a corrugated shape corresponding to the desired panel shape and dimensions, and a perforated mold screen 50 of matching shape positioned on top of plate 48. Screen 50 is used to carry the wet fiber mat 52 from the former box into the cold press, and also to carry the mat 52 after cold pressing from the lower plate of the cold press onto the lower plate of the hot press, as described above. The upper platen 45 in this embodiment comprises a single platen of non-perforated or non-porous elastomeric material having a lower surface shaped to substantially match the shape of the lower platen and the desired panel. The material of top platen 45 may be silicone based. Use of an elastomeric or rubber material for the top platen has been found to increase compression in the hot and cold press, increasing dewatering and densification of the mat. It also creates a smoother top surface in the panel.

Figure 7:
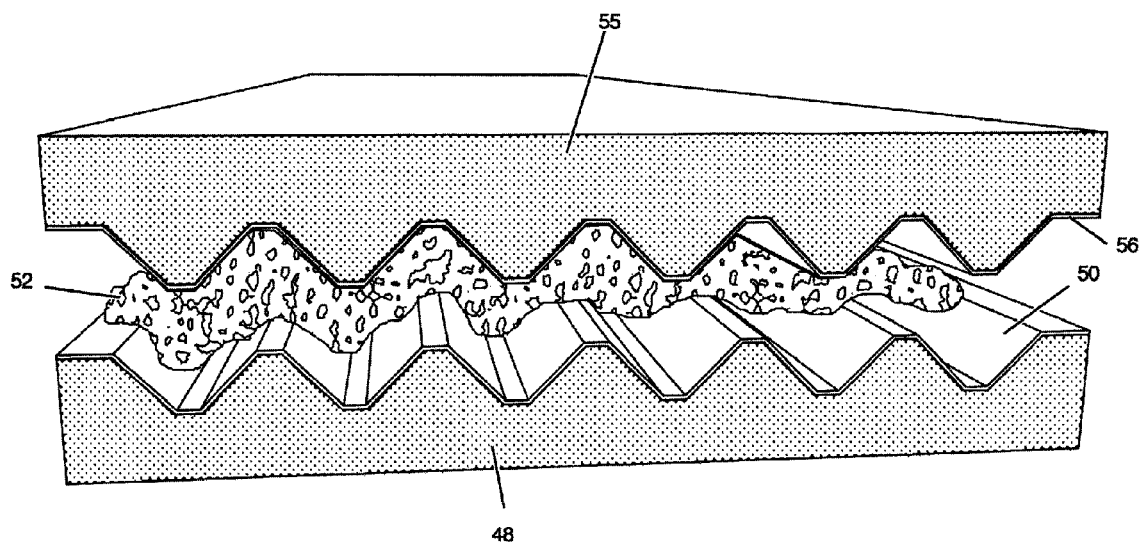
FIG. 7 is a cross-sectional view illustrating a cold or hot press similar to FIG. 5 but with a modified upper platen.
Figure 8:
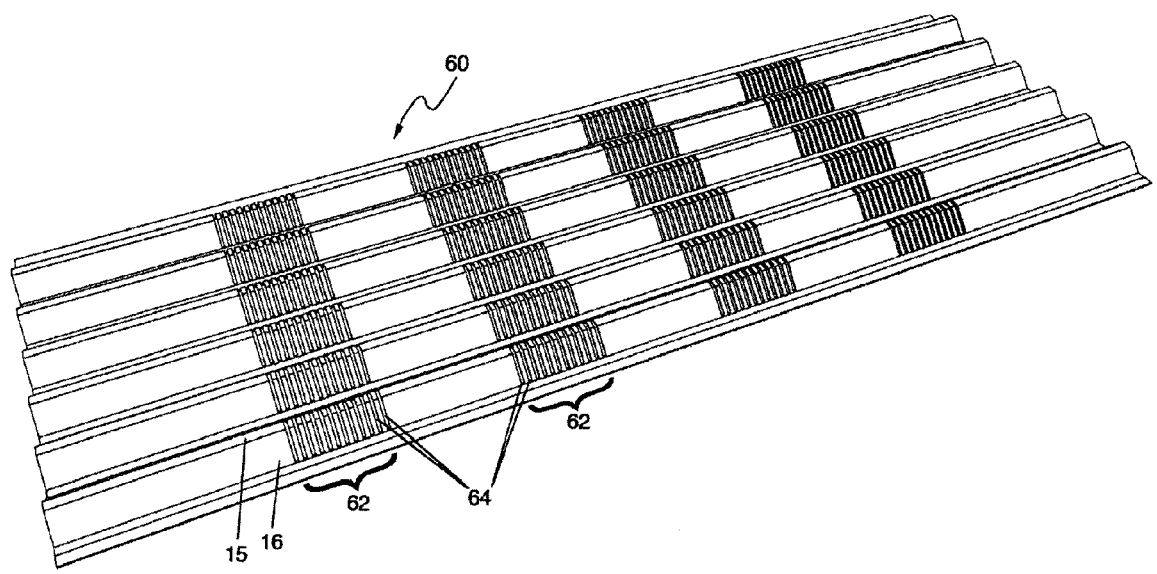
FIG. 8 is a perspective view of one embodiment of a slotted panel formed with spaced slotted portions of parallel slits.

FIG. 7 illustrates an alternative embodiment of the hot or cold press, in which the lower platen is identical to that of FIG. 6, but the elastomeric upper platen 45 is replaced with a rigid, perforated upper platen or press plate 55 of the desired shape, and a perforated top mold screen 56 fixed to the platen 55. In alternative embodiments, the top mold screen 56 is not fixed to the top platen in the hot or cold press. In this case, the top screen is transferred from the cold press to the hot press and is removed from the panel after hot pressing is complete to be returned to the former box exit area for placing on a wet mat carried on the lower mold screen when exiting the former box.

Using stainless steel molds, the above process may be used to create corrugated, three-dimensional panels and flat sheets with a nominal material thickness of 0.03"-0.33". Corrugated panels may have cross-sectional depth of from 0.5" to 1.5" and greater. These products may be laminated together to create exceptionally strong yet lightweight "stressed-skin" panels in various sizes and dimensions, for example the panels illustrated in FIGS. 4 and 5 above. When laminated together, one corrugated panel sandwiched between two flat panels forms a stressed-skin panel with a 3-dimensional geometric core that provides lateral stiffness and support to the two exterior faces. The resulting panels are lightweight and have high strength characteristics and design flexibility. This strength-to-weight characteristic is a result of the geometry of stressed-skin panels that, like an airplane wing, depend not upon a solid core of material for bending integrity, but upon the strength of the faces and integral ribs.

The wet forming process as described above for manufacturing fiberboard panels may use almost any type of fiber, extracting and incorporating cellulose from a host of organic and post-consumer waste materials, including urban sources of post-consumer fiber waste such as OCC and ONP, and rural sources of underutilized agricultural fiber such as BPF and crop residues. These highly sustainable fiber sources are much more widely distributed and more readily available than virgin wood, or even waste wood fibers, and can be utilized at much lower cost. This means that the panels may be manufactured in many regions, using many fiber sources, under a variety of conditions. In urban areas, the panels can utilize waste paper, cardboard, newsprint and other post-consumer waste materials that are plentiful in all cities and towns. In rural areas, an abundance of agricultural fibers, including raw plant fibers and bovine processed fiber (BPF) may be used as raw materials for the panels. The panels may be made using unused cereal crop residues such as wheat straw and rice straw, dedicated fiber crops (e.g., hemp, flax, kenaf). On cattle ranches and dairy farms, bovine waste (manure) is greatly underutilized, except as fertilizer and bedding. But with natural and mechanical digestion (via anaerobic digester technology already in use at many farms), this natural source of cellulose fiber may be used as a primary fiber source for the panels described above. As an added benefit, the methane produced as a natural byproduct of bovine fiber processing can be used to generate heat and electricity to run the production line. Water, another bi-product of dairy farm anaerobic digesters, can be used for the wet production process as well, with most of the water being reclaimed and recycled. These production enhancements may be achieved with only slight modifications to existing technology. In forested areas, the forest products industry has established long-standing centers for building product raw material sourcing and manufacturing. Many virgin fiber, as well as pre- and post-consumer fiber sources of raw materials, are available in forested areas in the northwest and southeast U.S., and elsewhere, and such materials may also be used in panel manufacture.

In or near parks and managed forest lands, panels may be manufactured from wood "waste" and undergrowth currently identified as "fire hazard" material by USDA in its National Fire Plan (NFP) for the reduction of fire hazards in the National, State, and private forests. According to the USDA, many forest stands in the Unites States are overcrowded and need to be thinned as part of good forest management. In the view of the traditional forest products industry, however, thinned forest materials are considered economically non-viable—i.e., too small and/or containing too many defects for structural lumber, and/or too costly to transport out of the forest for most commercial purposes. As a result, these underutilized wood fiber materials are often left on the forest floor. In seasonally dry environments typical of the western U.S., this wood-waste buildup can become a significant wildfire hazard, as recent history has shown, threatening not only old-growth trees and virgin timber, but also commercial and residential structures in the vicinity. The manufacturing process described above may provide an economically viable means to utilize this potentially dangerous forest material on a commercial scale while supporting public policy initiatives to reduce forest fire hazards and improve forest management.

In tropical and other regions (with or without crops, farms, or forests), prairie, tropical and other grasses, along with other waste or underutilized fibers, may be used to manufacture the panels. Prairie, tropical and other grasses are abundant throughout the world, and they are known to contain excellent cellulose fiber for wet process engineered molded fiber panel production. Although not yet utilized to the extent of wood-based fiber sources, sufficient research has shown the viability of these raw materials from all over the world. The ubiquity and diversity of possible raw material sources allows for potential panel production sites in the vicinity of each fiber source, potentially cutting down transportation and delivery distances to market, thereby reducing costs for bringing the panels and products made from the panels from factory to end-user. In addition, panel production near end users results in lower fuel consumptions and less pollution related to the transport/distribution process. Reduced weight of the final product (as low as 25% of traditional wood-fiber panels and materials) also significantly reduces the cost of shipping and delivery. In sum, the energy and labor efficiencies (along with the attendant environmental benefits) of producing lighter, significantly less toxic, easier to handle products nearer to the final market are abundant.

Although various different fiber sources for manufacturing the panels of FIGS. 1 to 4 have been described above, some improved panel properties have been found when combinations of two different fiber types with different properties are used. In one embodiment, a mixture of approximately 50% BPF and 50% ONP was found to have improved cellulose bonding and strength properties and result in more uniform densification due to the different fiber types.

Figure 9:
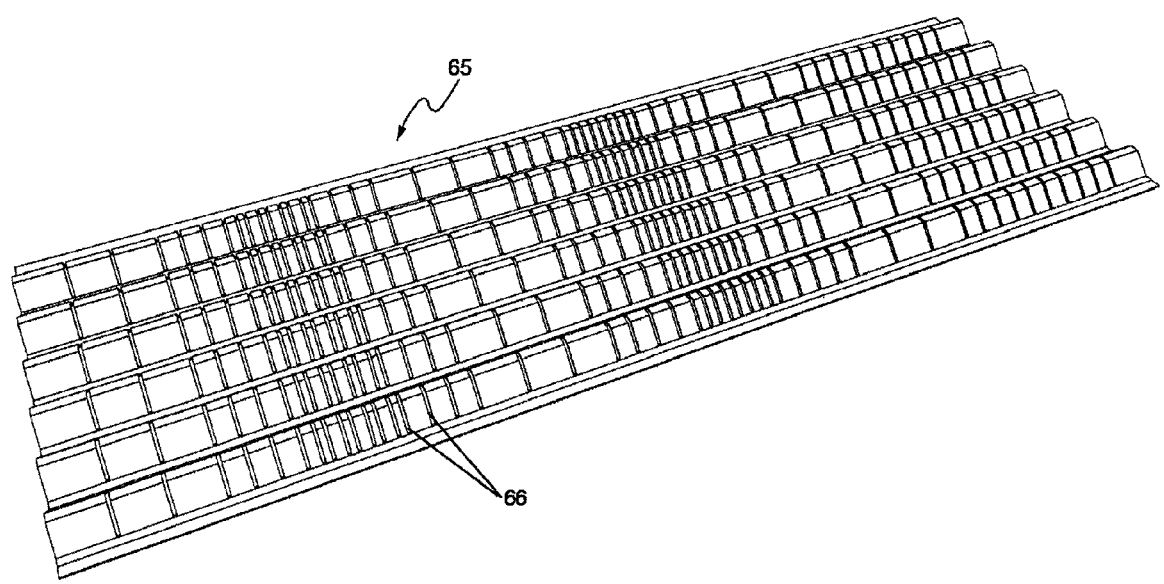
FIG. 9 is a perspective view of another embodiment of a slotted panel formed with slits at varying spacings.
Figure 12:
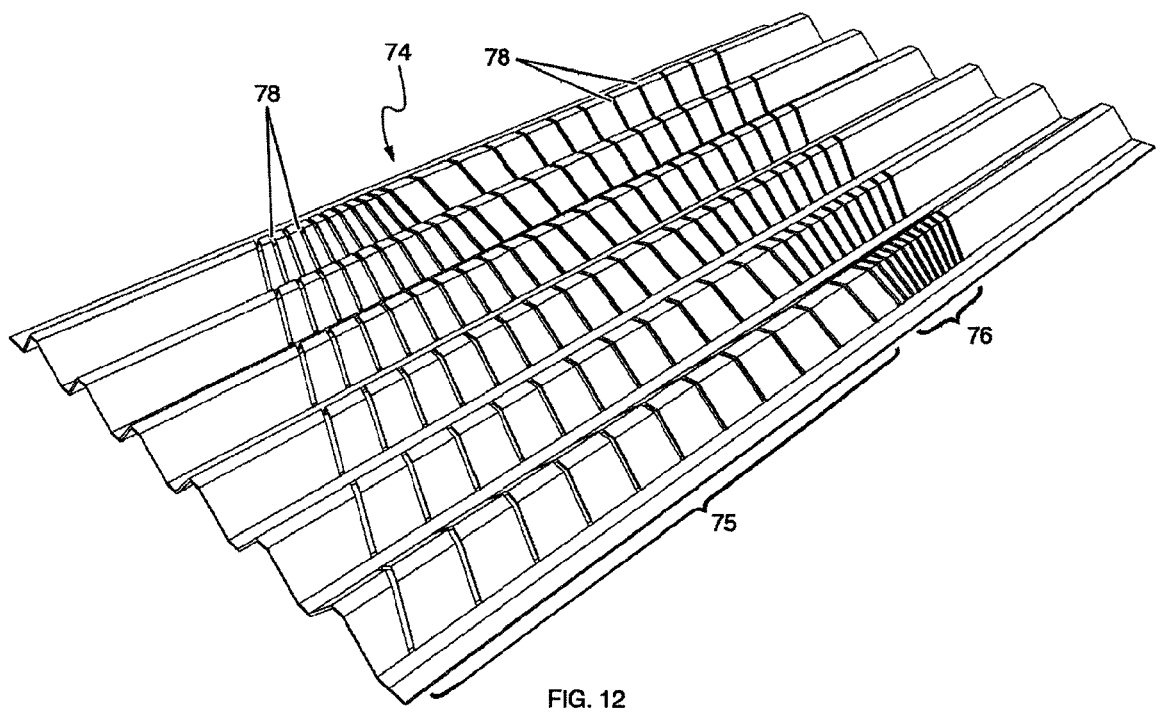
FIG. 12 is a perspective view of another embodiment of a slotted panel with an alternating radial slit configuration.
Figure 13:
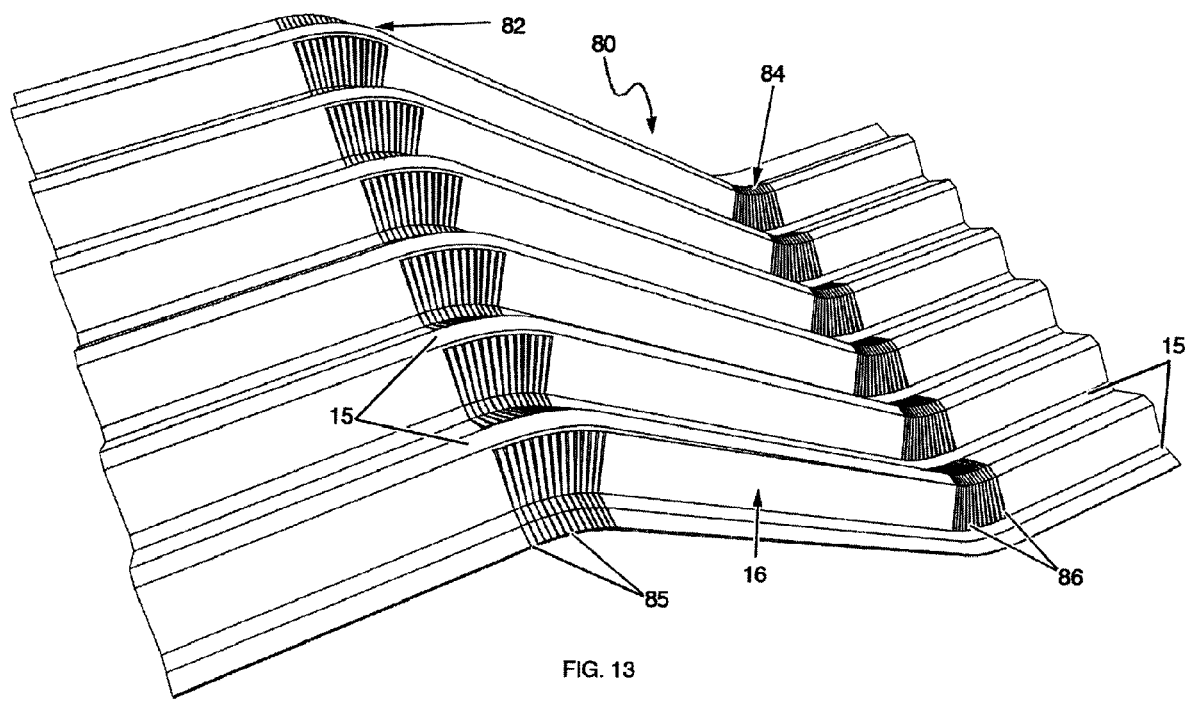
FIG. 13 is a perspective view of part of a slotted panel curved to form bends at the slotted portions.
Figure 14:
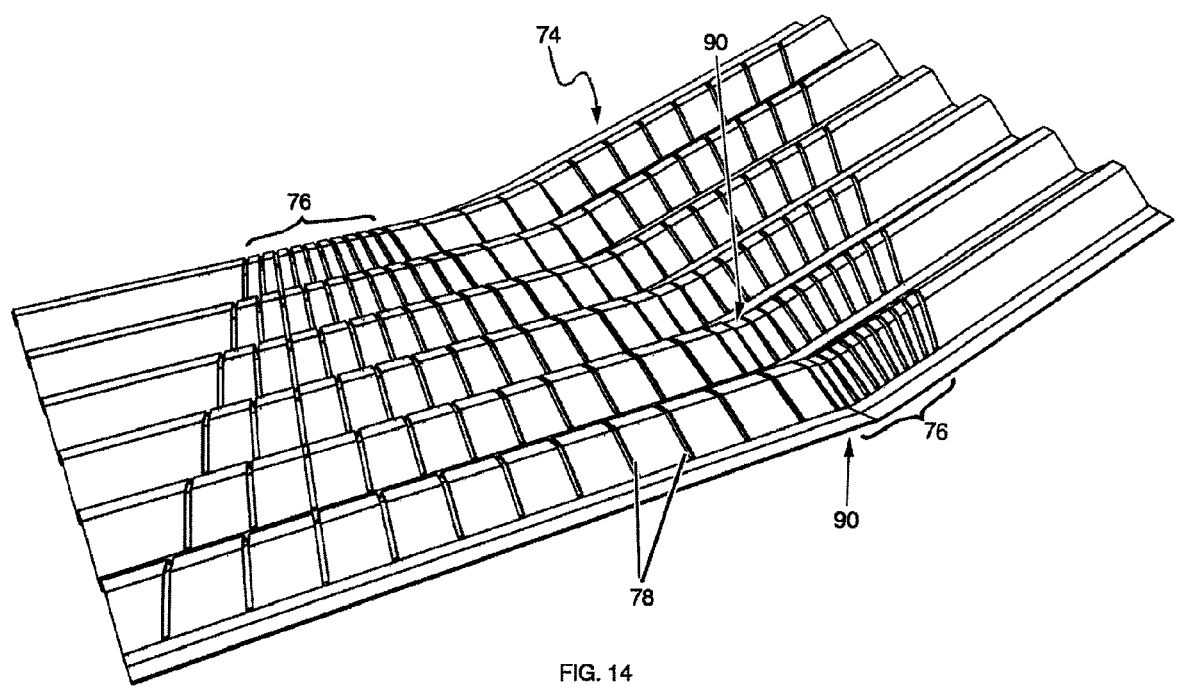
FIG. 14 is a perspective view illustrating a panel with alternating radial slits as in FIG. 12 with a bend formed at the one of the radial slit locations.

The corrugated or ribbed panels may be cut with a number of slits across the ribs of the corrugated panel in various ways, allowing the panel to be bent into a curve for use as a stand-alone product or as a core component of a sandwich stressed skin panel. Some alternative slit configurations are illustrated in FIGS. 8 to 12, while FIGS. 13 and 14 illustrate how curves or bends may be formed at the slotted panel regions. The slits are cut across the ribs from one face of the panel, terminating short of the peaks or flanges of the ribs on the opposing face, or may be cut alternately from one face and the opposite face in some cases. The slits may extend across the entire width or only part of the panel width. The panel 60 in FIG. 8 has a plurality of spaced slotted regions 62 each having a series of spaced slits 64 extending perpendicular to the rib direction. Slits 64 extend through the uppermost peaks 15 and side webs 16 in the illustrated orientation, but terminate short of the lowermost beaks 15. Instead of spaced slotted regions as in FIG. 8, slits may be provided along the entire length of the panel. Slotted regions may also be provided alternately on opposite faces of the panel, for example regions 62 as in FIG. 8 cut through the uppermost ribs as seen in this drawing, with opposing slotted regions in the gaps between regions 62 cut through the lowermost ribs and terminating short of the peaks of the uppermost ribs. FIG. 9 illustrates another embodiment of a slotted panel 65 which has slits 66 extending perpendicular to the ribs and are arranged at variable spacings, with alternating regions of closely spaced slits and widely spaced slits.

Figure 10:
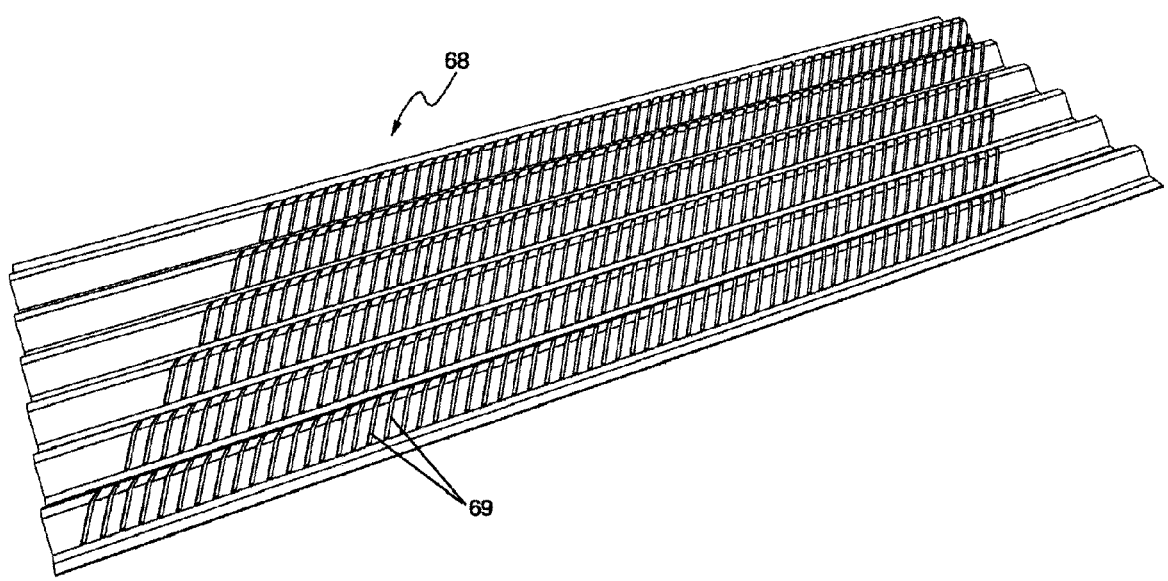
FIG. 10 is a perspective view of another embodiment of a slotted panel formed with diagonal slits.
Figure 11:
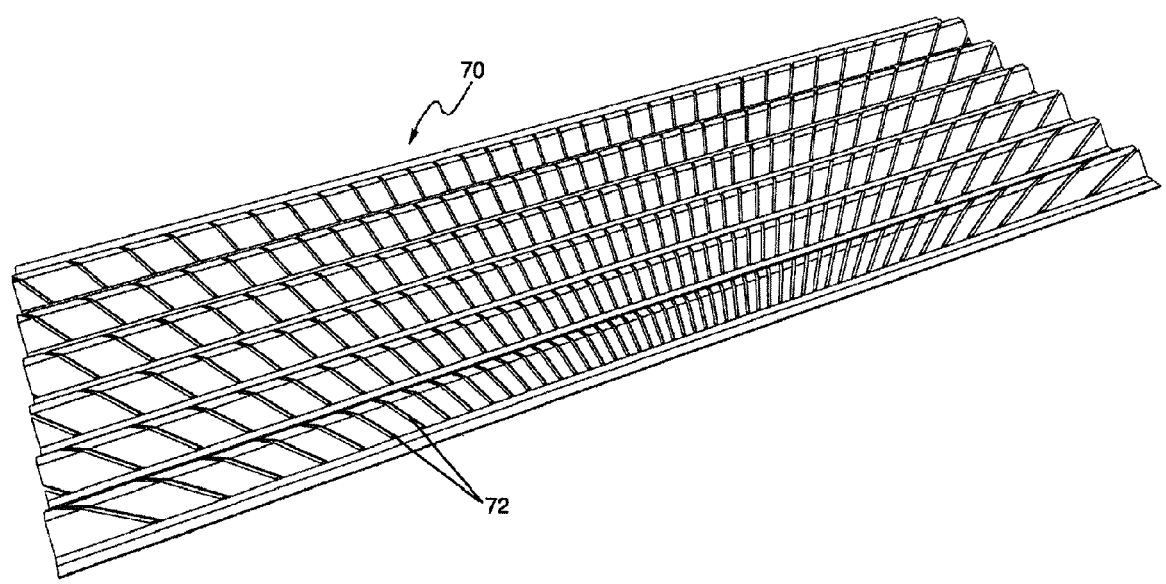
FIG. 11 is a perspective view of another embodiment of a corrugated panel formed with a radial slit configuration.

The panel 68 of FIG. 10 has slits 69 extending diagonal to the rib direction. Alternative versions of the panel 68 may have staggered groups of diagonal slits, alternating diagonal slits on opposite faces of the panel, or diagonal slits at variable spacings, as in FIG. 9. The panel 70 of FIG. 11 has slits 72 extending radially. In FIG. 12, a panel 74 is provided with alternating groups 75, 76 of radial slits 78, centered alternately on opposite sides of the panel. FIG. 14 illustrates the panel 74 of FIG. 12 with a bend or twist 90 formed at the location of the radial slits, generally at the junction between the two groups 76 of radial slits.

In one embodiment, slits are cut using a saw across the ribs of the corrugated panel from one face, not penetrating into the flanges along the opposite outer face of the panel, allowing the flanges along that outside plane to be continuous through the resultant curve. The panel may then be curved with the slits on the inside or the outside face of the curved panel. FIG. 10 illustrates one embodiment in which a slotted panel 80 has spaced slotted regions 82 and 84 which each have a series of perpendicular slits 85 and 86, respectively. The slits 85 are cut in the lower face as viewed in FIG. 13, extending through the lowermost ribs and terminating short of the peaks 15 of the uppermost ribs. The slits 86 are cut in the upper face and extend through the uppermost ribs, terminating short of the peaks of the lowermost ribs. The panel 80 is bent or curved in opposite directions at the slotted regions 82 and 84 to form first bend 88 and second bend 89. In each case, the slits 85 and 86 are positioned on the inside or concave part of the curve. It is helpful to position the slits on the inside of the curve due to the resultant limit when the slits close in towards each other as the panel is curved. A mathematical formula with rib height, slit width, on-center dimensions between slits determines the resultant inside and outside radius "stop" of the curves. The basic formula allows easy design to fabrication methods.

One version includes fixing the resultant curve with adhesive when the corrugated panel with slits is bent/curved to its automatic stop. The adhesive is applied between the slits at the inside of the curve where the slit closes due to the curving. Another version utilizes an additional strip of flat material with a width similar to that of the flange which has been slitted. The strip is adhered to the inside or outside face of the slitted flange, fixing the curve.

Slits can be designed in a variety of configurations, some of which are illustrated in FIGS. 8 to 14. These include perpendicular continuous, perpendicular with variable spacing (FIG. 9), perpendicular staggered (FIG. 8), perpendicular alternating, perpendicular alternating and staggered (FIG. 13), diagonal (FIG. 10), diagonal staggered, diagonal alternating, radial (FIG. 11), radial alternating to opposite sides of the panel (FIGS. 12 and 14), radial alternating on opposite faces of the panel, radial staggered, compound radial, variable on center slits to produce compound, variable radius curves, and so on.

Panels with slits as in FIGS. 8 to 14 can be used as stand-alone elements for interior design, containers, partitions and screens, ceiling tiles, and formwork for plaster, concrete and the like.

There are some benefits to making panels with curves using slits to make the curved sections more flexible. First, there is little or no "spring back" or "memory." Many methods of creating curves include bending of veneers or sheets or panels into a shape and fixing while setting. Such products typically spring back somewhat in the direction of the original shape. Curved panels made using slits as described above are stable in the finished shape since they contain little or no residual memory stress when in the set curved form. Curved, slotted rib panels may be stand alone or may have curved flat panels or skins adhered to their outer faces. This technique may be used to fabricate curves of multiple desired radii, including custom and compound curves.

The engineered molded fiber panels described above provide a family of high strength-to-weight, versatile component panel products which may be combined in a range of light weight structural panels with desirable surface features, consistency, shape, pliability, versatility, strength and other performance characteristics. Corrugated panels can be used by product manufacturers to create highly engineered and crafted end products which require a relatively low level of embedded material for required structural performance and thus are relatively light weight. Corrugated and flat panels may be nestled in a small volume for shipping and storage, utilizing as little as 10% of the volume required to ship and store commodity panel products. Standard wood fabrication tools and techniques may be used in most cases. Since conventional wood splintering does not occur with a molded fiberboard panel, no gloves are required. The panel edges may be fastened, edged, laminated and veneered as desired, providing significant design fabrication and application versatility. The corrugated and flat panels described above are flexible prior to being adhered together. Once laminated they form lightweight stressed-skin panels with relatively high strength, while maintaining some flexibility characteristics. The panels may be formed into self supporting soffets and valances without the need for an elaborate secondary structural frame.

The panels described above are made from recovered resources including waste paper and cardboard, wood residue, waste and under-utilized agricultural fiber, thus turning low cost raw materials into high quality panels. There is little or no toxic off-gassing during fabrication or after installation as often found in other panel materials. The manufacturing process is environmentally friendly with the ability to utilize local recycled and/or agricultural resources, creating the opportunity to site a manufacturing plant virtually anywhere in the world. This process also provides an alternative to virgin forest products, potentially lessening the impact of global deforestation, preserving habitat, encouraging sustainable business practices, and providing increased markets for post-consumer fiber waste. Little or no pollution is generated in the manufacturing process. The panel system is a very flexible three-dimensional engineer-able system that has many attractive performance characteristics. For example, the above panels may be engineered to have the same approximate bending stiffness as commercial grade particleboard (PB), but at approximately ¼ the weight.

The panel materials described above may be modified and coatings may be applied to enhance the water resistant properties. The panels also may be fire-retardant treated if used in applications requiring high classification in building fire performance.

To summarize, some of products' other unique features include: Light weight, providing reduced shipping and handling costs, decreased risk of workplace injuries and workers compensation claims, and increased consumer mobility. The panels utilize fiber selection, fiber processing, and 3D design to provide an engineered system that reduces weight per performance needs. High strength, providing increased product life, decreased damage in shipping and handling, and versatility in a number of product applications. "Curvability," providing quick, cost-effective structural curves in custom and even compound radii, giving designers and manufacturers tremendous fabrication flexibility and a broader scope of possible market applications. Ease of Fabrication, providing the ability to cut, fasten, laminate and edge using standard woodworking equipment and industrial techniques. Eco-Friendliness, providing products with high recycled content, reduced or minimum off-gassing and toxicity. The panels can be engineered from fibers to 3D geometry to final panel system to provide high performance while significantly reducing or minimizing total environmental impact. The panels can be made without resin, or with formaldehyde-free resins.

In comparative bending strength tests, 1.7" thick stressed skin panels with a corrugated panel core (see FIG. 4) test favorably when compared to the industry standard property requirements (ANSI Standards) for ¾" particleboard (PB) and medium density fiberboard (MDF). Thickness tolerances are plus/minus 0.005 to 0.010, equivalent to those for particleboard (PB) and medium density fiberboard MDF. Sanding provides smooth faces to accept surface treatments without telegraphing. Adjusted for specific gravity, 1.7" stressed skin panels are approximately 2 to 10 times stiffer than ¾" commercial particleboard and 2 to 3 times stiffer than medium density fiberboard ("MDF"). These properties are compared below for the three types of panels:

|  | Weight (Lb/ft²) | MOE (Stiffness) (PSI) | Specific Gravity | Specific MOE (PSI) |
| --- | --- | --- | --- | --- |
| 1.7" Stressed skin Panels | 1.63* | 288,000** | 0.184 | 1,570,000 |
| 1.75" stressed skin Panels | 1.93* | 375,000** | 0.212 | 1,770,000 |
| ¾" Low Density Particleboard (ANSI A208.1) | 2.0 | 79,800 | 0.5 | 160,000 |
| ¾" High Density Particleboard (ANSI A208.1) | 3.51 | 398,900 | 0.9 | 443,000 |
| ¾" Low Density - Medium Density Fiberboard (ANSI A208.2) | 1.95 | 203,100 | 0.5 | 406,000 |

-continued

|  | Weight (Lb/ft²) | MOE (Stiffness) (PSI) | Specific Gravity | Specific MOE (PSI) |
| --- | --- | --- | --- | --- |
| ¾" High Density - Medium Density Fiberboard (ANSI A208.2) | 3.91 | 425,000 | 1.0 | 450,000 |

*Weight is a measure of the composite panel system, i.e. outer skins and a corrugated panel core. The components for composite panel system could vary depending on the engineered needs. The actual weight may vary as needed for an engineered performance characteristic.
**Stiffness is a measure of the composite panel system. The composite panel materials could actually have higher MOE values, but as a 3D composite engineerable system the panel's apparent stiffness is as shown.
Notes to above chart:
Specific Gravity is a ratio that compares the density of a material to the density of water. It is a standard method for comparing density between materials.
Specific MOE is Apparent MOE/Specific Gravity. Dividing density into bending strength factors out the contribution of weight and allows a strength-to-weight comparison to be made. The higher the Specific MOE, the better the strength to weight.

The table below compares the linear expansion properties of a 1.7 inch composite panel as in FIG. 4 to all grades of particleboard and medium density fiberboard.

|  | Linear Expansion (%) |
| --- | --- |
| 1.7" Stressed Skin Panels | 0.15 to 0.3 |
| ¾" Low Density Particle board | 0.35 |
| ¾" High Density Particle board | 0.35 |
| ¾" Medium Density Particle board | 0.3 |

Linear expansion is a measure of a material's expansion response to moisture. Materials that remains stable (i.e. do not expand, buckle, warp, twist etc.) in varying moisture conditions are considered to be superior and will produce a low percentage linear expansion value.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A panel, comprising:
an elongated sheet of molded fiberboard material of corrugated shape having opposite first and second faces and opposite side edges, each face having a plurality of alternating, longitudinally extending ribs and grooves extending along the length of the sheet, the ribs on the first face each having a first peak and the ribs on the second face each having a second peak facing in the opposite direction to the first peaks;
the sheet having at least one slotted portion which has a plurality of spaced slits, each slit extending lengthwise across at least a plurality of the first peaks and being cut through part of the ribs of the first face including the first peaks to a depth less than the depth of the grooves in the first face and terminating short of the second peaks of the second face;
the panel being formed into at least one curve at said one, slotted portion with the slotted, first face of the sheet facing inward; and the slits are closed at the first peaks of the ribs on the inwardly curved first face of the sheet.

2. The panel of claim 1, wherein the slotted portion extends along at least a substantial portion of the length of the sheet.

3. The panel of claim 1, wherein the slits are at a constant spacing.

4. The panel of claim 1, wherein a first group of the plurality of slits are at a first spacing and a second group of the plurality of slits are at a second spacing different from the first spacing.

5. The panel of claim 1, wherein at least some of the plurality of slits are at a variable spacing.

6. The panel of claim 1, wherein the slits are parallel and extend perpendicular to the ribs.

7. The panel of claim 1, wherein the slits extend diagonally at an angle to the ribs.

8. The panel of claim 1, wherein the sheet has a plurality of spaced slotted portions and non-slotted portions extending between said spaced slotted portions.

9. The panel of claim 8, wherein the spaced slotted portions extend alternately through the first face and the second face of the sheet.

10. The panel of claim 1, wherein the slits extend radially.

11. The panel of claim 10, wherein spaced slotted portions are provided along the length of the sheet, each slotted portion having a set of radially arranged slits, and alternating slotted portions have radial slits centered on opposite sides of the sheet.

12. The panel of claim 10, wherein spaced slotted portions are provided alternately on opposite sides of the sheet along the length of the sheet, the alternating slotted portions on opposite faces having radial slits centered on opposite sides of the sheet.

13. The panel of claim 1, wherein the sheet is formed from at least one cellulose fiber material.

14. The panel of claim 13, wherein
the first and second peaks are flat and each first peak is connected to adjacent second peaks by angled webs forming opposite side faces of ribs;
the angle of the web is in the range from approximately 45 degrees to 60 degrees; and
the peaks on each face have a constant center to center spacing in the range from three inches to six inches and each rib has a height in the range from 0.75 inches to 3 inches.

15. A panel, comprising:
an elongated sheet of molded fiberboard material of corrugated shape having opposite first and second faces and opposite side edges, each face having a plurality of alternating, longitudinally extending ribs and grooves extending along the length of the sheet, the ribs on the first face each having a first peak and the ribs on the second face each having a second peak facing in the opposite direction to the first peaks;
the sheet having at least one slotted portion which has a plurality of spaced slits, each slit extending lengthwise across at least a plurality of the first peaks and being cut through part of the ribs of the first face including the first peaks to a depth less than the depth of the grooves in the first face and terminating short of the second peaks of the second face;
the panel being formed into at least one curve extending along at least part of the length of the sheet at said one, slotted portion with the slotted first face of the sheet facing inward; and
the slits are closed with adhesive at least at the first peaks of the ribs on the inwardly curved first face of the sheet.

* * * * *